(12) United States Patent
Van Vlassenrode et al.

(10) Patent No.: US 10,794,068 B2
(45) Date of Patent: Oct. 6, 2020

(54) FLOOR PANEL AND METHOD FOR MANUFACTURING A FLOOR PANEL

(71) Applicant: IVC BVBA, Avelgem (BE)

(72) Inventors: Kristof Van Vlassenrode, Deinze (BE); Nick Vanhulle, Anzegem (BE)

(73) Assignee: IVC BVBA, Avelgem (BE)

(*) Notice: Subject to any disclaimer, the term of this patent is extended or adjusted under 35 U.S.C. 154(b) by 0 days.

(21) Appl. No.: 16/333,364

(22) PCT Filed: Sep. 28, 2017

(86) PCT No.: PCT/IB2017/055965
§ 371 (c)(1),
(2) Date: Mar. 14, 2019

(87) PCT Pub. No.: WO2018/065859
PCT Pub. Date: Apr. 12, 2018

(65) Prior Publication Data
US 2019/0211571 A1    Jul. 11, 2019

Related U.S. Application Data

(60) Provisional application No. 62/443,166, filed on Jan. 6, 2017.

(30) Foreign Application Priority Data

Oct. 3, 2016 (BE) .................... 2016/5732

(51) Int. Cl.
*E04F 15/10* (2006.01)
*B32B 5/02* (2006.01)
(Continued)

(52) U.S. Cl.
CPC .............. *E04F 15/107* (2013.01); *B32B 3/30* (2013.01); *B32B 5/02* (2013.01); *B32B 9/02* (2013.01);
(Continued)

(58) Field of Classification Search
CPC .................. E04F 15/107; E04F 15/105; E04F 2201/0161; E04F 15/02; B32B 3/30;
(Continued)

(56) References Cited

U.S. PATENT DOCUMENTS 5,080,944 A * 1/1992 Kauffman ............... B29B 15/08
156/163
5,112,671 A * 5/1992 Diamond ................ B32B 27/30
428/156
(Continued)

FOREIGN PATENT DOCUMENTS

EP 1207051 A2 5/2002
EP 2447063 A1 5/2012
(Continued)

OTHER PUBLICATIONS

International Search Report in related PCT Application No. PCT/IB2017/055965, dated Mar. 8, 2018.
(Continued)

*Primary Examiner* — Jeanette E Chapman
(74) *Attorney, Agent, or Firm* — Bacon & Thomas, PLLC (57) ABSTRACT

Floor panel, which comprises a substrate and a top layer provided above, and preferably directly above, the substrate, wherein the top layer comprises a décor layer, a thermoplastic wear layer, and a lacquer layer provided above, and preferably directly above, the wear layer, and wherein the floor panel has an upper surface showing a relief, wherein the relief has a maximum relief depth which is larger than 100 microns, and wherein the wear layer and the lacquer layer are embossed in order to form the relief.

18 Claims, 2 Drawing Sheets

(51) Int. Cl.
| | |
|---|---|
| *B32B 9/02* | (2006.01) |
| *B32B 9/04* | (2006.01) |
| *B32B 21/02* | (2006.01) |
| *B32B 21/06* | (2006.01) |
| *B32B 21/08* | (2006.01) |
| *B32B 27/08* | (2006.01) |
| *B32B 27/10* | (2006.01) |
| *B32B 27/12* | (2006.01) |
| *B32B 3/30* | (2006.01) |
| *E04F 15/02* | (2006.01) |

(52) U.S. Cl.
CPC .............. *B32B 9/042* (2013.01); *B32B 9/045* (2013.01); *B32B 21/02* (2013.01); *B32B 21/06* (2013.01); *B32B 21/08* (2013.01); *B32B 27/08* (2013.01); *B32B 27/10* (2013.01); *B32B 27/12* (2013.01); *E04F 15/02* (2013.01); *E04F 15/105* (2013.01); *B32B 2255/10* (2013.01); *B32B 2255/26* (2013.01); *B32B 2255/28* (2013.01); *B32B 2262/101* (2013.01); *B32B 2307/408* (2013.01); *B32B 2307/412* (2013.01); *B32B 2307/414* (2013.01); *B32B 2471/00* (2013.01); *E04F 2201/0161* (2013.01)

(58) Field of Classification Search
CPC ......... B32B 27/12; B32B 27/10; B32B 27/08; B32B 21/08; B32B 21/06; B32B 21/02; B32B 9/045; B32B 9/042; B32B 9/02; B32B 5/02; B32B 2471/00; B32B 2307/414; B32B 2307/412; B32B 2307/408; B32B 2262/101; B32B 2255/28; B32B 2255/26; B32B 2255/10
USPC ....................................................... 52/588.1
See application file for complete search history.

(56) References Cited

U.S. PATENT DOCUMENTS

| | | | | |
|---|---|---|---|---|
| 5,710,209 | A * | 1/1998 | Blum | C08G 18/0819 524/538 |
| 6,080,296 | A * | 6/2000 | Lieverz | B05D 7/577 204/486 |
| 6,114,008 | A * | 9/2000 | Eby | B29C 44/06 428/151 |
| 6,228,463 | B1 * | 5/2001 | Chen | B05D 7/54 428/158 |
| 6,509,411 | B1 * | 1/2003 | Fieberg | C08F 290/067 205/224 |
| 6,746,756 | B2 | 6/2004 | Simon et al. | |
| 9,079,212 | B2 * | 7/2015 | Pervan | B05D 3/12 |
| 9,216,610 | B2 * | 12/2015 | Schacht | B44C 1/10 |
| 9,885,188 | B2 * | 2/2018 | Clement | B44C 5/04 |
| 2003/0108718 | A1 * | 6/2003 | Simon | B29C 44/06 428/172 |
| 2003/0138618 | A1 * | 7/2003 | Courtoy | B29C 59/046 428/308.4 |
| 2003/0209313 | A1 * | 11/2003 | Stoll | B32B 38/06 156/209 |
| 2012/0199249 | A1 * | 8/2012 | Almen | C09D 9/005 144/332 |
| 2013/0295346 | A1 * | 11/2013 | Ferguson | E04C 2/26 428/196 |
| 2016/0201324 | A1 * | 7/2016 | H Kansson | E04C 2/24 428/195.1 |

FOREIGN PATENT DOCUMENTS

| | | |
|---|---|---|
| EP | 2447064 A1 | 5/2012 |
| EP | 2636524 A1 | 9/2013 |
| EP | 2883712 A1 * | 6/2015 |
| EP | 2883712 A1 | 6/2015 |
| WO | 9747834 | 12/1997 |
| WO | 2009065769 A2 | 5/2009 |
| WO | 2013026559 A2 | 2/2013 |
| WO | 2015158595 A1 | 10/2015 |

OTHER PUBLICATIONS

Written Opinion in related PCT Application No. PCT/IB2017/055965, dated Mar. 8, 2018.

* cited by examiner

FLOOR PANEL AND METHOD FOR MANUFACTURING A FLOOR PANEL

BACKGROUND OF THE INVENTION

Field of the Invention

The present invention relates to a floor panel and a method for manufacturing a floor panel.

More particularly, the invention relates to a decorative floor panel, for which laminate and parquet floor panels are known examples. Mostly, the substrate of these floor panels is wood-based. Laminate floor panels, for example, typically have a substrate comprising MDF or HDF. Parquet floor panels, apart from a wood-based substrate, also have a wooden top layer. This top layer comprises, for example, wood veneer. Due to this wooden top layer, these parquet floor panels automatically have a natural appearance. With laminate floor panels, this is somewhat different. They do not have a wooden top layer, but a top layer consisting of one or more, often melaminated, paper sheets. Mostly, this relates to a paper sheet with a printed decor and a provided thereon paper sheet, whether or not provided with corundum, which acts as a wear layer. The wear layer may be embossed, for example, by means of a structured press element, in order that the upper surface of the floor panel should show a relief. This relief then is used together with said decor for still imparting the laminate floor panel a natural "look and feel". Typically, it is striven for simulating wood, stone or ceramics.

Another class of decorative floor panels is the one in which the floor panels are based on synthetic material, of which class LVT and WPC floor panels are known examples. These floor panels mostly have a thermoplastic substrate, which, apart from the thermoplastic synthetic material, also may comprise additives and/or fillers. The top layer of these floor panels mostly also is composed of one or more thermoplastic layers. Reference is made to document WO 2013/026559 for an exemplary composition of such product. Similarly to laminate floor panels, the intention with these synthetic material-based floor panels also is that the upper surface thereof obtains a natural character. To this aim, also mostly use is made of a decor and an embossed wear layer, by which a relief is realized in the upper surface of the floor panel. Again, reference is made to document WO 2013/026559, in which such example is described. However, with synthetic material-based floor panels, obtaining a natural look and feel is problematic. This is especially so because of the type of wear layer mostly applied, namely a thermoplastic wear layer. An example, which also is mentioned in the document WO 2013/026559, is a PVC wear layer. Not only is this wear layer mostly scoring unsatisfactorily in respect to features such as wear resistance, scratch resistance, stain resistance and the like. Moreover, it also gives a plastic-like appearance to the floor panels, which is caused by the highly glossy character thereof. In order to address these problems, it is known to provide a lacquer layer above or on the wear layer. However, the known techniques thereof have proven insufficient, certainly in the case that the upper surface of the floor panel has a relief.

Related Art

In the document WO 2013/026559, which has been introduced hereinbefore already, it is described to apply a lacquer layer on an embossed or deformed wear layer. However, the inventor has found that with this technique there is a high risk that blinking or glossy spots are visible in the upper surface of the floor panel. These spots are annoying and give an unnatural appearance to the floor panel. The problem seems to rise in particular with deep relief.

Document EP 2 883 712 describes providing two lacquer layers on a wear layer, with the aim of creating a difference in gloss degree. Although thereby the artificial look of the wear layer can be addressed, purely applying two lacquer layers seems not sufficient for removing the risk of glossy spots.

In document U.S. Pat. No. 6,746,756 is described to provide a lacquer layer on a wear layer and then embossing the lacquer layer in order to form a relief. Contrary to the above-mentioned document WO 2013/026559, this here relates to a lacquer layer which as such is embossed. To this aim, this lacquer layer is realized on the basis of a UV-curable PU dispersion; at least the document stipulates this. This technique is said to achieve a more accurate relief in comparison with, for example, the technique from document WO 2013/026559. However, the type of lacquer used thereby may be problematic. With PU dispersions it is difficult to obtain a floor panel with a good score in respect to features such as wear resistance, scratch resistance, stain resistance and the like.

Document WO 2015/158595, too, describes the possibility of an embossed PU top lacquer starting from a radiation-curable PU dispersion. However, the document primarily is focused on obtaining a VOC release barrier via the PU top lacquer and less to obtaining a naturally looking and feeling floor panel. In the document, also values are mentioned of the relief depth obtained. This varies between 10 and 100 microns or micrometers.

SUMMARY OF THE INVENTION

The present invention primarily aims at an alternative floor panel. In addition, the invention has the aim of offering a solution to one or more of the aforementioned or other problems with thermoplastic wear layers. In particular, the invention strives at nevertheless giving floor panels with thermoplastic wear layers a natural look and feel.

To this aim, the invention relates to a floor panel and a method as defined in the appended independent claims, wherein preferred embodiments are defined in the dependent claims.

The invention is based on a first insight of the inventor that the glossy spots are caused by interruptions in the lacquer layer, by which the glossy wear layer becomes visible.

In addition, the invention is based on a second insight of the inventor that the cause of the interruptions is in the applied technique, wherein the lacquer layer is provided on an embossed wear layer. The inventor has found that by this technique the deeper zones in the wear layer are not reached, not even with a rubber roller, due to which the lacquer layer thus is interrupted in these zones and thus is not present.

The invention is based on a third insight of the inventor that embossing the lacquer and wear layers, instead of embossing the wear layer and then providing the lacquer layer, results in a continuous lacquer layer, which is free from interruptions and is present in deeper zones of the relief. Thus, hereby the problem of the glossy spots can be addressed.

According to a first independent aspect, the invention relates to a floor panel which comprises a substrate and a top layer provided above, and preferably directly above, the substrate, wherein the top layer comprises a decor layer, a thermoplastic wear layer, and a lacquer layer provided above the wear layer, and wherein the floor panel has an upper surface showing a relief, with the characteristic that the relief has a maximum relief depth which is larger than 100 microns, and that the wear layer and the lacquer layer are embossed in order to form the relief. As the relief is so deep, a naturally-looking and -feeling floor panel can be obtained. Coarse or deep relief structures can be simulated, which can be found in, for example, wood or stone. Moreover, the invention allows, notwithstanding the deep relief, to avoid the formation of glossy spots, as already explained herein above. Summarized, the first aspect thus allows realizing deep or coarse relief structures without the occurrence of glossy or blinking spots. The result is a very naturally-looking and -feeling floor panel.

Preferably, the lacquer layer is embossed along with the wear layer. This means that both layers preferably are embossed together.

Preferably, the lacquer layer is provided directly above the wear layer. The wear layer is provided above, and preferably directly above, the decor layer.

Preferably, the wear layer is transparent or translucent. In this manner, thus, the decor of the decor layer is visible. In fact, this is valid for the embossed lacquer layer as well. However, the lacquer layer can be used for determining the gloss degree of the floor panel.

Preferably, the maximum relief depth is larger than 200 micron or still better larger than 250 micron. In this way, the upper surface of the floor panel will look and feel even more natural.

The relief can be realized in that the substrate is also embossed, and preferably with or together with the wear layer and/or the lacquer layer. In this case, it is advantageous that the substrate comprises a flexible or semi-rigid thermoplastic substrate layer directly underneath the substrate layer. Such layer in fact can be embossed in a simple manner. Moreover, such layer also is advantageous for sound damping.

Preferably, the embossed lacquer layer is made on the basis of a polyurethane or PU dispersion. This results in that the lacquer layer can be embossed in a simple manner. In particular, the solid matter content of the PU dispersion is situated between 30% and 40%, limits included.

The PU dispersion may be water- or solvent-based, however, it is preferred that the PU dispersion is water-based or waterborne.

The PU dispersion can be curable by means of radiation. Preferably, it is curable via UV or ultraviolet radiation. This provides for that the PU dispersion can be cured in a simple manner and a good degree of crosslinking can be obtained. This has a positive influence on the mechanical and chemical resistance. In particular, the PU dispersion is curable by means of excimer radiation. This allows obtaining a matte lacquer layer.

In a variant, the PU dispersion is thermally curable. However, it is more difficult to completely cure such dispersion. The cause of the difficult curing are the often too low temperatures in the manufacturing process of floor panels. An incompletely cured lacquer is disadvantageous for the mechanical and chemical resistance. Therefore, it is preferred to add a crosslinker to such dispersion in order to accelerate the curing process. Preferably, this relates to a 2K crosslinker.

It is also noted that the embossed lacquer layer can be realized on the basis of a combination of different types of PU dispersions. So, for example, a combination of a soft and a hard PU dispersion can be used.

The embossed lacquer layer may comprise an acrylate copolymer. Such copolymer provides extra flexibility.

The embossed lacquer layer may comprise a crosslinker. An example of a suitable crosslinker is polyaziridine.

Possibly, the lacquer layer may comprise ceramic particles. These particles enhance features such as wear resistance and scratch resistance. The ceramic particles may comprise aluminum oxide particles. Preferably, the particles have a diameter situated between 2 and 20 microns, limits included. The particles can be coated with silanes in order to embed them better into the possibly used PU dispersion.

The embossed lacquer layer can form the uppermost layer of the floor panel. However, this can be somewhat disadvantageous, certainly in the case that this lacquer layer is realized on the basis of a PU dispersion. In fact, it is difficult to have a good score with PU dispersions in respect to features such as wear resistance, scratch resistance, stain resistance and the like.

This is why in an important variant the top layer above, and preferably directly above, the embossed lacquer layer comprises another lacquer layer, herein below called additional lacquer layer. This additional lacquer layer then can be applied in order to rectify features such as wear resistance, scratch resistance, stain resistance and the like.

Preferably, the additional lacquer layer forms the uppermost layer of the floor panel Preferably, the additional lacquer layer is transparent or translucent. In fact, it can be used to determine the gloss degree of the floor panel.

Preferably, this relates to a lacquer layer which is not embossed or deformed, which means that in this lacquer layer no relief is formed by means of embossing. The fact that such lacquer layer can show interruptions, no longer forms a problem. The high-gloss surface of the wear layer is already optimally shielded or covered by the embossed lacquer layer. In fact, the embossed lacquer layer can be visible at the location of possible interruptions in the additional lacquer layer, for example, in the case that both lacquer layers are situated directly on top of each other. However, these interruptions can be obscured by performing both lacquer layers with the same or approximately the same gloss degree. Or, a matte embossed lacquer layer may be chosen, as a result of which a possible difference in gloss degree will not or almost not be noticeable. That the additional lacquer layer concerns a not embossed or not deformed lacquer layer, offers more choice possibilities towards the composition thereof. In fact, it does not have to be embossed anymore and can be chosen in function of features, such as wear resistance, scratch resistance, and/or stain resistance.

Preferably, the additional lacquer layer is performed on the basis of a lacquer with a solid matter content of 100%. This allows obtaining a lacquer layer with excellent mechanical and chemical resistance, which, of course, is beneficial for features such as wear resistance, scratch resistance and stain resistance.

The additional lacquer layer can be performed on the basis of a radiation-curable lacquer. This preferably relates to a UV-curable lacquer. In particular, it is an excimer-curable lacquer.

In a variant, the additional lacquer layer is performed on the basis of a thermally curable lacquer.

The additional lacquer layer may comprise polyurethane.

Preferably, the relief simulates the texture of a natural product, such as wood, stone or ceramics. In the case of wood, the relief may simulate, amongst others, wood nerves and/or pores. Possible bevels on one or more edges of the upper surface of the floor panel do not belong to such relief or are not considered as forming part of the relief. Such bevels in fact are not directed to simulating a natural texture, but rather to providing a plank effect.

The relief may or may not be performed in register with the decor of the decor layer. Performing in register entails the advantage that a more naturally looking and feeling floor panel is obtained. Different techniques are known for realizing such embodiment, and reference is made in particular to the following documents: EP 2 636 524, EP 2 447 063 and EP 2 447 064.

Preferably, the decor of the decor layer depicts a natural product. So, the decor can simulate, for example, wood, stone or ceramics.

Preferably, the decor of the decor layer is printed or imprinted. This may be, for example, by means of any of the following printing techniques: offset printing, gravure printing, or a digital printing technique, in which, for example, a digital printer or inkjet printer is applied. However, other printing techniques are not excluded.

The decor layer may comprise a carrier on which the decor is imprinted or printed. This carrier can be a film or a foil. This may relate to a thermoplastic carrier.

In a variant, the decor of the decor layer is imprinted or printed directly on the substrate. Thus, actually the decor as such then forms the decor layer. However, it is not excluded that the decor is imprinted or printed on a primer present on the substrate.

In another variant, the decor of the decor layer is imprinted or printed on the lower side of the wear layer. Here, too, the decor as such forms the decor layer.

The wear layer may relate to a foil or film.

In a variant, the wear layer, in the form of a liquid mass, is provided above or directly above the decor layer, and cured. Herein, a calendering technique may be applied.

In a practical embodiment, the top layer exclusively consists of the decor layer, the wear layer and the embossed lacquer layer and the possible additional lacquer layer.

The substrate may comprise one or more substrate layers.

The substrate may comprise a thermoplastic substrate layer. This layer can be rigid, semi-rigid or flexible.

The thermoplastic substrate layer may or may not be foamed.

In a particular embodiment, the substrate comprises a semi-rigid or flexible thermoplastic layer underneath, and preferably directly underneath, the decor layer. Such layer can entail various advantages, such as that the substrate is easily embossable in order to form the relief, and a good sound absorption. Preferably, such semi-rigid or flexible layer is combined with a substrate layer thereunder relating to a rigid thermoplastic layer or relating to a wood-based layer of, for example, MDF or HDF. This layer situated underneath entails other advantages, such as an improved resistance against impact, against so-called "indentations", against telegraphing and the like. Also, such layer allows producing strong mechanical coupling parts therein.

The substrate may comprise one or more reinforcement layers. The reinforcement layer preferably is composed of reinforcing fibers, such as glass fibers. This relates, for example, to a glass fiber cloth or glass net.

The substrate may comprise a backing on the lower surface of the floor panel. This backing can provide for a balancing effect which prevents a warping of the floor panel. The backing can also be provided in order to achieve other effects, such as sound damping.

The backing can comprise cork.

In a variant, this relates to a thermoplastic backing. It may be a flexible or semi-rigid backing in order to improve sound damping. However, in an alternative embodiment it may be a rigid backing in order to improve the resistance against telegraphing.

The thickness of the floor panel preferably is situated between 3 and 12 cm.

The upper surface of the floor panel can show a bevel on at least one edge. This may relate to a bevel which is not reaching deeper than the wear layer. In a variant, this relates to a deeper bevel which is reaching into the substrate. In that case, preferably a separate decoration, such as a lacquer, is applied on the upper surface of the bevel. Here, by "separate decoration" is meant that the decoration is separate from the decor layer. Or, the top layer, including the decor layer, may extend over the deeper bevel. This relates, for example, to a so-called "pressed bevel".

The bevel may relate to a chamfer or rounding. However, other types of bevels are not excluded.

Preferably, the floor panel is suitable for forming a floating floor covering. This is a floor covering in which the floor panels can be installed loosely or floatingly on the underlying surface or subfloor. To this aim, the floor panel, on at least one pair of opposite edges, is provided with integrated mechanical coupling parts, wherein these coupling parts allow effecting a locking between two of such floor panels in a direction perpendicular to the plane of the coupled floor panels and parallel to the plane of the coupled floor panels and perpendicular to the coupled edges. Such coupling parts are known as such from WO 97/47834.

That the coupling parts are integrated does mean that they form a fixed part of the floor panel. This is possible in that the coupling parts are connected to the floor panel or in that they are made in one piece with and from the material of the floor panel.

That these are mechanical coupling parts does mean that they allow effecting a mechanical coupling without the necessity of glue or the like.

It is noted that the application of an embossed and a preferably not embossed or not deformed lacquer layer with thermoplastic wear layers as such forms an inventive idea. Thus, the invention, according to an independent second aspect, also relates to a floor panel which comprises a substrate and a top layer provided above, and preferably directly above, the substrate, wherein the top layer comprises a decor layer, a thermoplastic wear layer, and a lacquer layer provided above, and preferably directly above, the wear layer, and wherein the floor panel has an upper surface showing a relief, with the characteristic that the wear layer and the lacquer layer are embossed in order to form the relief, and that the top layer above, and preferably directly above, the embossed lacquer layer comprises a preferably not embossed or not deformed lacquer layer, herein below called additional lacquer layer. This second aspect allows avoiding the formation of glossy spots. And there do not have to be any losses in features such as wear resistance, scratch resistance and stain resistance. In fact, the additional lacquer layer can be used in order to rectify the last-mentioned features. This second aspect thus allows obtaining a floor panel which does not only feel and look natural, without glossy or blinking spots, but which also is extremely resistant to wear, scratches and/or stains.

Preferably, the embossed lacquer layer is embossed together with the wear layer. This means that both layers preferably are embossed together.

The floor panel according to this second aspect further can show one or more characteristics of the floor panel according to the first aspect without requiring that the maximum relief depth is larger than 100 microns.

It is also mentioned that the embossed lacquer layer of the first or second aspect preferably shows one or more of the following characteristics:

- The lacquer layer is present over the entire wear layer or over the entire surface of the wear layer, and thus also in possible deep zones of the relief;
- the lacquer layer has a uniform or approximately uniform thickness; and/or
- at the location of the embossments, the lacquer layer has a thickness which is equal to or smaller than the thickness thereof in other zones of the upper surface.

The first-mentioned characteristic provides for that no glossy spots will appear, as the glossy surface of the wear layer is not visible from the upper surface of the floor panel. The second and/or third characteristic provide for that a good impressing or embossing resolution can be obtained.

It is noted that the three preceding characteristics as such are advantageous measures for use in combination or each separately combined with the first or second aspect, without thereby requiring that the respective lacquer layer has to be embossed.

According to an independent third aspect, the invention relates to a method for manufacturing a floor panel which has an upper surface showing a relief with a maximum relief depth which is larger than 100 microns. This method comprises at least the following steps:

- providing a substrate;
- providing a top layer above, and preferably directly above, this substrate, which top layer comprises a decor layer, a thermoplastic wear layer, and a lacquer layer provided above, and preferably directly above, the wear layer; and
- embossing, preferably together, the wear layer and the lacquer layer in order to form the relief.

This method allows obtaining the floor panel of the first aspect.

The lacquer layer is situated above the wear layer. However, it is not extraordinary that the lacquer layer is situated directly above the wear layer. Indeed, this is preferred. However, in a variant one or more intermediate layers can be present.

Preferably, the lacquer layer is provided above the wear layer prior to providing the wear layer with any relief. In other words, it is preferred that the lacquer layer is provided above the wear layer while the wear layer or the upper surface of the wear layer still is flat or approximately flat. Hereby, the lacquer layer can easily be provided on the entire surface of the wear layer, in view of the fact that no deep zones will have to be reached. Subsequently embossing the wear layer and the lacquer layer results in a relief-formed upper surface not showing any glossy spots.

The lacquer layer can be provided above the wear layer by means of any suitable coating technique, such as gravure coating, roll coating, curtain coating, spray coating and combinations thereof. However, it is preferred to apply the lacquer layer by means of a roller and in particular a rubber roller.

In a practical embodiment, the method comprises a step in which the wear layer, whether together with one or more other layers or not, is connected to a remaining of underlying part of the floor panel. In the case that the wear layer is connected together with one or more other layers, this other layer may concern a layer of the top layer, such as, for example, the decor layer. In a variant, the other layer may concern a substrate layer, for example, with a multi-layered substrate, wherein the wear layer, possibly together with the decor layer, together with the substrate layer is connected with one or more remaining substrate layers.

Connecting the wear layer may take place by means of any suitable connection technique, such as a coating, calendering or laminating technique. The laminating technique, wherein heat and/or pressure are used, such as thermally laminating, is preferred. In particular, herein a, possibly heated, press device is employed.

Preferably, the lacquer layer is provided above the wear layer prior to connecting this wear layer with the remaining or underlying part of the floor panel. In this phase of the production process, the conditions are excellent for applying the lacquer layer. However, it is not excluded to apply the lacquer layer after connecting the wear layer; however, probably the conditions will be less favorable.

The embossing, whether or not together, of the wear layer and the lacquer layer may take place by means of any suitable embossing technique. Preferably, this relates to a mechanical embossing technique, whereby, for example, a structured roller or structured press element can be employed.

In a particular embodiment, the floor panel, after forming the relief, is immersed in a water bath. This water bath, so to speak, provides for the "freezing" of the relief, by which a more accurate relief can be obtained.

Preferably, the lacquer layer is cured after it is embossed. This provides for that the lacquer layer, when it is embossed, still is soft or flexible, such that a relief simply can be formed therein by embossing.

It may be advantageous to subject the lacquer layer to a so-called "pre-cure". This means that the lacquer layer, at a certain moment in the process, will be cured or dried partially, however, not completely. Preferably, this partial curing or drying takes place before the lacquer layer is embossed. This provides for that the relief can be defined better in the lacquer layer and thus a more accurate relief can be obtained.

The pre-cure is in particular advantageous in the case that the lacquer layer is provided above the wear layer prior to connecting this wear layer with a remaining or underlying part of the floor panel. The pre-cure then best takes place prior to connecting the wear layer. This provides for that the lacquer layer will be less impaired by the connection process and will keep its structure better. This is because the pre-cure already can provide for a certain degree of crosslinking. Certainly when applying a, possibly heated, press device for laminating the wear layer, which is provided with the lacquer layer, to the remaining or underlying part of the floor panel, the pre-cure is useful. In the press device, the lacquer layer in fact comes into contact with a press element which can be hot. Due to the pre-cure, the lacquer layer will be less impaired thereby.

Above the lacquer layer, another lacquer layer, herein additional lacquer layer, can be provided. Herein, it is not necessary that this additional lacquer layer is situated directly above the other lacquer layer; however, this is preferred.

The additional lacquer layer can be employed in order to rectify features such as wear resistance, scratch resistance and stain resistance. To this aim, this lacquer layer preferably is provided after the relief is formed. Then, this lacquer layer in fact does not have to be embossed, such that, for example, a harder lacquer can be chosen.

Both lacquer layer preferably are cured together. This is advantageous in view of the fact that then only one curing station will have to be provided to this aim. Moreover, this common curing provides for that a mutual crosslinking can occur between the lacquer layers. This is beneficial for features, such as wear resistance, scratch resistance and stain resistance.

However, it is not excluded that both lacquer layers are cured separately. In that case, it can be chosen for curing both lacquer layers with a different technique, for example, the one with UV radiation and the other with excimer radiation. This can be advantageous in respect to obtaining a difference in gloss degree, such as described as such in document EP 2 883 712.

Providing the top layer on the substrate does not have to be performed in a single step. The layers of the top layer each can be provided separately, in several steps, on the substrate. Or a plurality of layers of the top layer can be provided on the substrate together. For example, the decor layer can be provided on the substrate together with the wear layer. It is also possible that, in the case of a multi-layered substrate, the top layer or a part of the top layer is provided on one or more substrate layers, after which this intermediary product then is provided on the remaining substrate layer or layers.

Any suitable connecting technique may be used for mutually connecting the layers of the floor panel. Coating, calendering and laminating techniques are mentioned as examples, however, other connecting techniques are not excluded.

The one or more substrate layers can be formed in any suitable manner. For example, strewing, extrusion and/or calendering techniques are employed. The first-mentioned technique can be employed with wood-based as well as with thermoplastic substrate layers. The two last-mentioned techniques are primarily useful with thermoplastic substrate layers.

The floor panel obtained according to the method of the third aspect further may show one or more characteristics of the floor panel according to the first aspect.

According to an independent fourth aspect, the invention relates to a method for manufacturing a floor panel, wherein this floor panel has an upper surface showing a relief, and wherein this method comprises at least the following steps:
  providing a substrate;
  providing a top layer above, and preferably directly above, the substrate, which top layer comprises a decor layer, a thermoplastic wear layer, and a lacquer layer provided above, and preferably directly above, the wear layer;
  embossing, preferably together, the wear layer and the lacquer layer in order to form the relief; and
  providing another lacquer layer above, and preferably directly above, the above-mentioned lacquer layer, preferably after the relief has been formed.

Preferably, both lacquer layers are cured together. However, it is not excluded that both lacquer layers are cured separately.

This method further can show one or more of the characteristics of the method of the third aspect, without the maximum relief depth necessarily being larger than 100 microns.

The floor panel that is obtained according to the method of the fourth aspect, further can show one or more of the characteristics of the floor panel according to the second aspect.

It is also noted that providing the lacquer layer above the wear layer prior to connecting this wear layer to a remaining or underlying part of the floor panel and, whether or not together, embossing the wear layer and the lacquer layer forms an inventive idea as such. Therefore, the invention, according to an independent fifth aspect, relates to a method for manufacturing a floor panel, wherein this floor panel has an upper surface showing a relief, and wherein the method comprises the following steps:
  providing a substrate;
  providing a top layer above, and preferably directly above, the substrate, which top layer comprises a decor layer, a thermoplastic wear layer, and a lacquer layer provided above, and preferably directly above, the wear layer;
  connecting the wear layer to a remaining or underlying part of the floor panel (1)
  providing the lacquer layer above, and preferably directly above, the wear layer prior to connecting the wear layer to the remaining or underlying part of the floor panel; and
  embossing, preferably together, the wear layer and the lacquer layer in order to form the relief.

This method can further show one or more of the characteristics of the method according to the third or fourth aspect, without the maximum relief depth necessarily being larger than 100 microns and without the top layer necessarily comprising an additional lacquer layer which preferably is provided after the forming of the relief.

It is also noted that the application of the aforementioned water bath forms an inventive idea as such. Therefore, the invention, according to an independent sixth aspect, relates to a method for manufacturing a floor panel, wherein this method comprises at least the following steps:
  providing a substrate;
  providing a top layer above, and preferably directly above, the substrate, which top layer comprises a decor layer and a thermoplastic wear layer;
  embossing the wear layer in order to form a relief in the upper surface of the floor panel; and
  immersing the floor panel in a water bath after the relief has been formed.

This method further may show one or more of the characteristics of the method according to the third and fourth aspect, wherein the maximum relief depth is not necessarily larger than 100 microns and the top layer does not necessarily comprise an additional lacquer layer which preferably is provided after the forming of the relief.

It is also noted that the aforementioned steps of the methods according to the third through the second aspects preferably are performed as a continuous process.

It is noted that by the expression "the one layer above or underneath the other layer", it is not necessarily meant that the one layer is situated directly above or underneath the other layer. Moreover, in the case that the one layer is situated directly above or underneath the other layer, it is not excluded that an intermediary adherence or connecting layer, such as a glue layer, is present.

The terms "rigid", "semi-rigid", and "flexible" have to be understood as follows:
  a rigid thermoplastic layer is a thermoplastic layer comprising plasticizers in an amount of maximum 15 phr, limits included;
  a semi-rigid thermoplastic layer is a thermoplastic layer comprising plasticizers in an amount of maximum 15, however, smaller than 20 phr; and a flexible thermoplastic layer is a thermoplastic layer comprising plasticizers in an amount of at least 20 phr.

One or more plasticizers from the following group can be used: DOP, DINCH, DINP and DOTP.

The term "thermoplastic layer" is used for a layer comprising a thermoplastic synthetic material. This is valid for any thermoplastic layer described herein. In particular, reference is made to the possible embodiments for the decor layer, the wear layer and the one or more substrate layers.

Generally, it is valid that the thermoplastic synthetic material preferably is selected from the following group: polyvinylchloride, polyethylene, polypropylene, polyethylene terephthalate and polyurethane. However, other synthetic materials are not excluded.

Besides the thermoplastic synthetic material, the thermoplastic layer can also comprise fillers and/or additives. In respect to the fillers this may concern one or more of the following:
- an inorganic filler, such as chalk, talc or lime;
- an organic filler, such as wood or bamboo particles; and/or
- a mineral filler, such as ceramic particles.

In particular for the one or more substrate layers it is valid that these may or may not be foamed.

It is noted that the present invention may not only be applied with floor panels. It may be applied with any type of decorative panels, such as wall, ceiling or door panels.

The invention can also be applied more broadly than with panels only. It can be applied with any type of floor elements. Examples are floor elements on a roll or wall-to-wall floor elements, such as wall-to-wall vinyl.

BRIEF DESCRIPTION OF THE DRAWINGS

With the intention of better showing the characteristics of the invention, herein after, as an example without any limitative character, some preferred embodiments are described, with reference to the accompanying drawings, wherein.

DETAILED DESCRIPTION OF THE INVENTION

Figure 1:
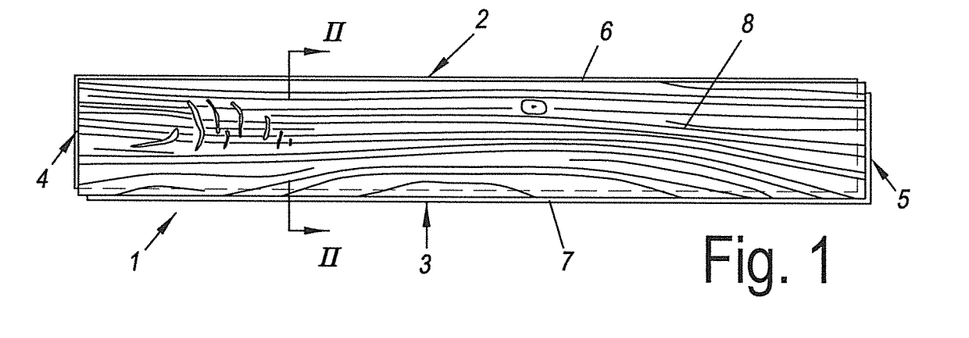
FIG. 1 represents a floor panel according to the invention.

FIG. 1 represents a floor panel 1 according to the invention.

This relates to a rectangular floor panel which is oblong; however, the invention is not limited thereto. In a variant, for example, a square floor panel or a floor panel in another polygonal shape or geometrical shape.

The floor panel 1 is suitable for forming a floating floor covering. It comprises a pair of long edges 2-3 and a pair of short edges 4-5 and is provided, at least at the pair of long edges 2-3, with integrated coupling parts 6-7, which allow effecting a mechanical coupling between two of such floor panels. An example of such coupling parts 6-7 is described in greater detail in respect to FIG. 2.

Further, the floor panel 1 comprises an upper surface 8, which relates to the visible surface of the floor panel 1 when the latter is installed on an underlying surface or subfloor. The opposed surface, which is directed towards the underlying surface, is named the lower surface. The upper surface 8 shows a decor which, in the represented example, relates to a wood decor with wood nerves and pores.

Figure 2:
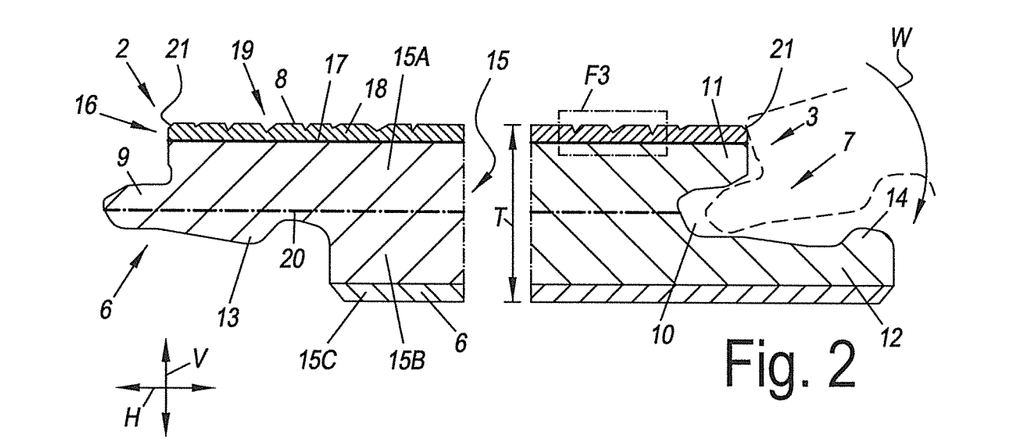
FIG. 2 represents a cross-section according to line II-II in FIG. 1.

FIG. 2 represents a cross-section according to line II-II in FIG. 1.

In this figure, the form of the coupling parts 6-7 can be seen. These coupling parts 6-7 allow effecting a locking between two of such floor panels in the vertical direction V and in the horizontal direction H perpendicular to the coupled edges.

The coupling parts 6-7 are of the type allowing to couple two of such floor panels 1 by means of a turning movement W. Here, this relates to a particular type of coupling parts, considering that they also allow coupling the floor panels by means of a substantially horizontal movement of the floor panels in respect to each other, with the performance of a snap action. This last-mentioned manner of coupling is not represented.

The coupling parts 6-7 are performed in the form of a tongue 9 and a groove 10, wherein the groove 10 is bordered by an upper lip 11 and a longer lower lip 12. Locking elements 13-14 are provided as well, which counteract or even prevent the moving apart of the tongue 9 and groove 10 in the horizontal direction H.

The coupling parts 6-7 are substantially and here even entirely manufactured in one piece with and from the material of the substrate 15.

It is noted that other types of coupling parts can be applied. In this manner, coupling parts can be applied of the type allowing to couple the floor panels by means of a turning movement, however, not by a substantially horizontal snap movement. Still another type is formed by the so-called "push-lock" coupling parts, which allows coupling the floor panels by means of a downward and substantially vertical movement.

It is not excluded that the short edges 4-5, too, are provided with integrated mechanical coupling parts. These can be of the same type as the coupling parts on the long edges, however, this is not necessarily the case. A particular embodiment is the one wherein on the long pair of edges turning coupling parts are applied, whereas on the short pair of edges push-lock coupling parts are applied.

In this embodiment, the floor panels can be coupled to adjacent floor panels in a single turning movement, the so-called "fold-down" movement, on the long edge as well as on the short edge. In a variant, the turning coupling parts are applied on the short edges and the push-lock coupling parts on the long edges.

From FIG. 2, also the general construction of the floor panel 1 becomes clear. The floor panel 1 comprises a substrate 15 and a top layer 16, wherein the top layer 16 comprises at least a decor layer 17 and a thermoplastic wear layer 18.

The upper surface 8 of the floor panel 1 shows a relief 19, which may or may not be performed in register with the decor of the decor layer 17.

In the represented example, the substrate 15 is multilayered. In particular, it comprises three substrate layers 15A-15B-15C, which all are flexible thermoplastic layers. This concerns, for example, layers composed of supple or flexible PVC.

The substrate 15 comprises a reinforcement layer 20, which may comprise reinforcing fibers, such as glass fibers. In particular, this may relate to a glass fiber cloth.

The upper surface 8 comprises a bevel 21 on each of the long edges 2-3. These bevels 21 here relate to chamfers, which do not reach deeper than the wear layer 18. The upper surface thereof is formed in particular by the wear layer 18.

At the short edges 4-5, too, bevels may be applied.

The floor panel has a thickness T situated between 3 and 12 mm.

Figure 3:
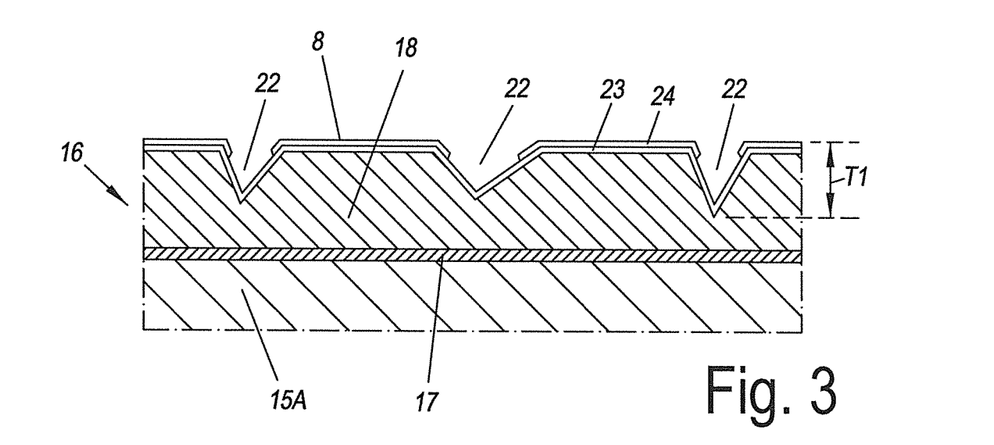
FIG. 3 represents in an enlarged manner that what is indicated by F3 in FIG. 2.

FIG. 3 in an enlarged view represents that which is indicated by F3 in FIG. 2.

From this figure, the precise construction of the top layer 16 becomes clear.

As already mentioned, the upper surface 8 of the floor panel 1 comprises a relief 19, which is formed by embossed zones 22. This relates to a relief which is used for simulating the texture of a natural product, in the example a wood texture. The bevels 21 thus do not form part of this relief, considering that they primarily are provided in order to simulate a plank effect rather than a natural texture. Thus, the depth of the bevels does not have to be considered when determining the maximum relief depth.

The relief 19 shows a maximum relief depth T1 which is larger than 100 microns and preferable is even larger than 200 or 250 microns. The relief depth is to be understood as the height difference between the deepest point of the relief 19 and the global level of the upper surface 8, as represented in the figure.

The top layer 16 comprises the embossed wear layer 18, as well as an embossed lacquer layer 23. As the lacquer layer 23 itself is embossed, the lacquer layer 23 is present over the entire wear layer 18 and even on the bottom of the embossed zones 22. Moreover, the lacquer layer 23 has a uniform or approximately uniform thickness, which can be somewhat thinner at the location of the embossed zones 22, due to which a good embossing resolution can be obtained.

In the represented example, the substrate 15 is not embossed in order to form the relief 19. However, in a variant this substrate 15 can be embossed in order to realize the deep relief. Herein, it is preferred that the substrate layer directly underneath the decor layer 17 is flexible or semi-rigid, which is the case here with the substrate layer 15A, considering that such substrate layer is easier to emboss or deform.

The wear layer 18 and the lacquer layer 23 preferably are transparent or translucent, such that the decor of the underlying decor layer 17 is visible. However, the lacquer layer 23 can be used for determining the gloss degree of the upper surface 8, as already described herein above.

The lacquer layer 23 may form the uppermost layer of the floor panel. However, in the example, above the lacquer layer 23 and in particular directly above the lacquer layer 23, an additional lacquer layer 24 is present as well. This lacquer layer 24 forms the uppermost layer of the floor panel 1. This preferably relates to a transparent or translucent lacquer layer 24. This lacquer layer 24 preferably is provided on the lacquer layer 23 only and thus best relates to a not embossed or not deformed lacquer layer. This makes this lacquer layer 24 extremely suitable for addressing the wear resistance, scratch resistance and/or stain resistance. As this lacquer layer 24 does not have to be embossed, there is of course a broader choice of lacquers which can be used. Thus, a lacquer can be chosen in function of the aforementioned features. The lacquer layer 24 is absent in one or more embossed zones 22 and especially on the bottom thereof.

Figure 4:
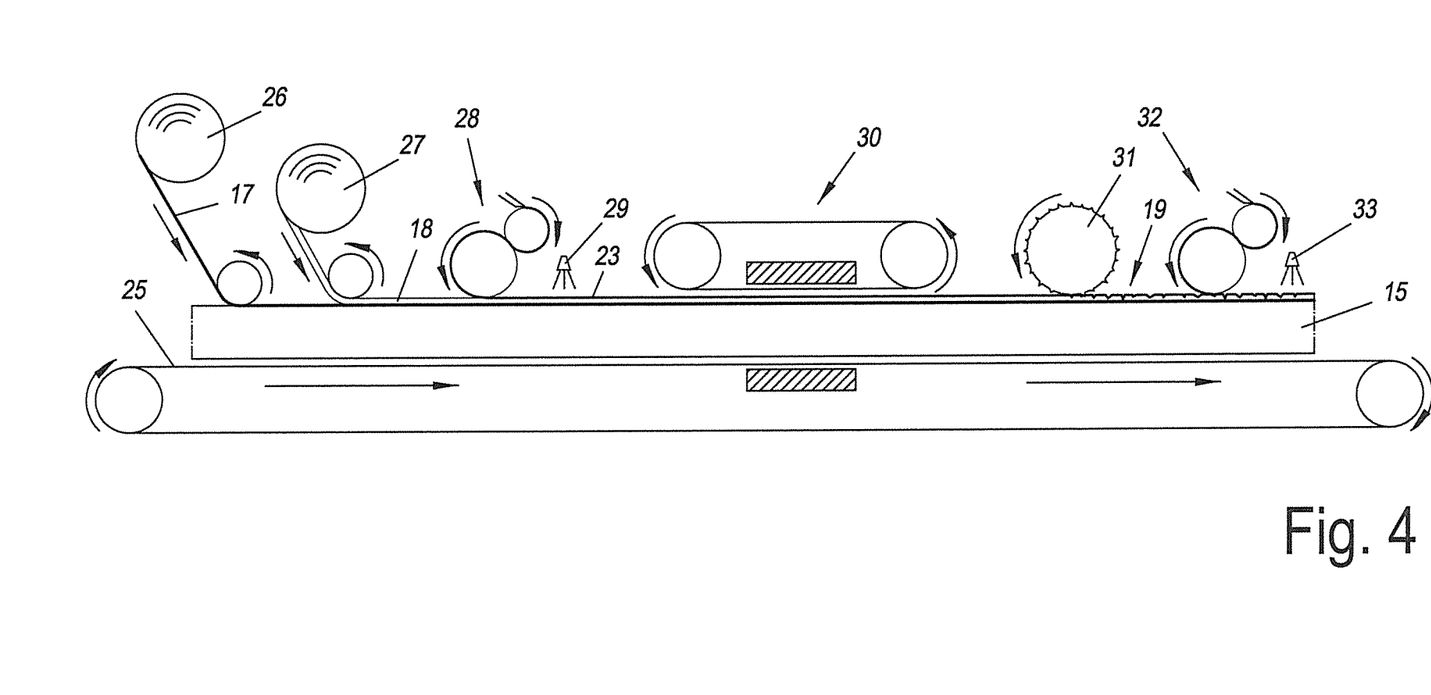
FIG. 4 represents a method according to the invention which can be applied for manufacturing the floor panel of FIG. 1.

FIG. 4 represents a method with which the floor panel 1 of FIG. 1 can be manufactured.

In the method, the substrate 15 is provided. It is not represented how this substrate 15 has been manufactured. Any suitable technique, such as a strewing, extrusion and/or calendering technique, may be used to this aim.

Above this substrate 15, the top layer 16 is provided, while the substrate 15 is moved along on a continuous conveyor 25. In the example, providing the top layer 16 is performed in a plurality of steps.

In a first step, the decor layer 17 is provided. By definition, the decor layer 17 comprises the decor, wherein the decor in the example is imprinted or printed on a thermoplastic foil or film, for example, a PVC film. This printed PVC film here is unwound from a roll 26 and provided above the substrate 15.

Subsequently, the wear layer 18 is provided above the decor layer 17. In the example, this wear layer 18 relates to a thermoplastic foil or film, such as a PVC film. Similar to the decor layer 17, this film is unwound from a roll 27 and provided above the decor layer 17.

In a following step, the lacquer layer 23 is provided above the wear layer 18, by means of a rubber roller 28. This takes place before the wear layer 18 is provided with any relief.

The lacquer which is used in order to form the lacquer layer 23 preferably comprises a water-based UV-curable PU dispersion with a solid matter content situated between 30% and 45%, limits included. This lacquer may also contain other components or ingredients, such as already explained above.

In the example, the lacquer, in a following step, is subjected to a pre-cure. To this aim, one or more UV lamps 29 can be employed.

In a next step, the whole consisting of the substrate 15, the decor layer 17, the wear layer 18 and the lacquer layer 23 is connected in a preferably heated press device 30.

It is noted that the lacquer layer 23 thus is provided prior to connecting the wear layer 18 with a remaining or underlying part of the floor panel 1. Moreover, the lacquer layer 23, as described earlier, is subjected to a pre-cure, which in this case is advantageous indeed.

After consolidation, the lacquer layer 23 is embossed together with the wear layer 18 by means of a mechanical embossing technique in order to form the relief 19. In the example, to this aim use is made of a structured roller 31. However, in a variant use may also be made of a structured press element, such as a press plate. In that case embossing may take place at the same time as connecting the wear layer in the preceding step, if such connecting is performed by means of a structured press element.

Possibly, the floor panel 1 subsequently can be immersed in a water bath. This step is not explicitly represented in the figure. Such water bath provides for a more accurate relief, considering that this, so to speak, freezes the relief and provides for that the relief is maintained throughout the further process.

In the example, an additional lacquer layer 24 is provided above the lacquer layer 23 by means of a rubber roller 32. This lacquer layer 24 does not have to be embossed, considering that the relief 19 has been formed already. Thus, a harder lacquer can be chosen, which is beneficial for the wear resistance and scratch resistance of the final floor panel. Preferably, the lacquer employed for the lacquer layer 24 has a solid matter content of 100% and is UV curable. This lacquer can also comprise PU.

Subsequently, both lacquer layers 23-24 are cured together by means of one or more UV lamps 33.

It is clear that in order to form the final floor panel, the continuous web still has to be divided into individual elements, which then form the floor panels. To this aim, for example, a cutting or sawing process can be employed.

Further, the method can also comprise the step of providing coupling parts on at least one pair of opposed edges of the floor panels. To this aim, cutting or milling tools can be applied.

It is noted that the term "horizontal" is applied for indicating a direction in the plane of the floor panel. The term "vertical" is applied for indicating the direction perpendicular to the plane of the floor panel.

The present invention is in no way limited to the herein above-described embodiments, on the contrary may such floor panels and methods be realized according to various variants, without leaving the scope of the present invention.

The invention claimed is:

1. A floor panel, which comprises:
   a substrate; and
   a top layer provided above, and preferably directly above, the substrate,
   wherein the top layer comprises a decor layer, a thermoplastic wear layer, a lacquer layer provided above, and preferably directly above, the wear layer, and an additional lacquer layer above the lacquer layer, and
   wherein the floor panel has an upper surface showing a relief, wherein the relief has a maximum relief depth which is larger than 200 microns, and
   wherein the wear layer and the lacquer layer are embossed in order to form the relief and the additional lacquer layer is not embossed or deformed, and
   wherein the embossed lacquer layer is made based upon a polyurethane dispersion with solid matter content between 30 and 40%, limits included.

2. The floor panel of claim 1, wherein the maximum relief depth is larger than 250 microns.

3. The floor panel of claim 1, wherein the substrate, in order to form the relief, also is embossed.

4. The floor panel of claim 1, wherein the substrate comprises a flexible or semi-rigid thermoplastic substrate layer directly underneath the decor layer.

5. The floor panel of claim 1, wherein the lacquer layer comprises ceramic particles.

6. The floor panel of claim 5, wherein the ceramic particles have a diameter situated between 2 and 20 microns, limits included.

7. The floor panel of claim 1, wherein the embossed and additional lacquer layers show a different gloss degree.

8. The floor panel of claim 1, wherein the embossed lacquer layer is made matte.

9. The floor panel of claim 1, wherein the additional lacquer layer forms the uppermost layer of the floor panel.

10. The floor panel of claim 1, wherein the wear layer is provided above, and preferably directly above, the decor layer, in the form of a liquid mass, and cured.

11. The floor panel of claim 1, wherein the substrate comprises one or more substrate layers.

12. The floor panel of claim 11, wherein the substrate comprises a backing on the lower surface of the floor panel.

13. The floor panel of claim 12, wherein the backing concerns a thermoplastic layer.

14. The floor panel of claim 1, wherein the floor panel is suitable for forming a floating floor covering, the floor panel, on at least one pair of opposite edges, is provided with integrated mechanical coupling parts and wherein these coupling parts allow effecting a locking between two of such floor panels in a direction perpendicular to the plane of the coupled floor panels and in a direction parallel to the plane of the coupled floor panels and perpendicular to the coupled edges.

15. The floor panel of claim 1, wherein the embossed lacquer layer comprises acrylate copolymer.

16. A floor panel, which comprises:
   a substrate; and
   a top layer provided above, and preferably directly above, the substrate,
   wherein the top layer comprises a decor layer, a thermoplastic wear layer, a lacquer layer provided above, and preferably directly above, the wear layer, and an additional lacquer layer above the lacquer layer, and
   wherein the floor panel has an upper surface showing a relief, wherein the wear layer and the lacquer layer are embossed in order to form the relief, and
   wherein the top layer above, and preferably directly above, the embossed lacquer layer comprises a preferably not embossed or deformed lacquer layer, and
   wherein the embossed lacquer layer is made based upon a polyurethane dispersion with solid matter content between 30 and 40% limits included,
   wherein the preferably not embossed or deformed lacquer layer has a solid matter content of 100%.

17. The floor panel of claim 16, wherein the maximum relief depth is not necessarily larger than 100 microns.

18. A method for manufacturing a floor panel, wherein the floor panel has an upper surface showing a relief, and wherein the method comprises the following steps:
   providing a substrate;
   providing a top layer above, and preferably directly above, the substrate, which top layer comprises a decor layer, a thermoplastic wear layer, and a lacquer layer provided above, and preferably directly above, the wear layer;
   connecting the wear layer to a remaining or underlying part of the floor panel;
   providing the lacquer layer above the wear layer prior to connecting the wear layer to the remaining or underlying part of the floor panel;
   embossing, preferably together, the wear layer and the lacquer layer in order to form the relief; and
   providing an additional lacquer layer above the embossed lacquer layer,
   wherein the embossed lacquer layer is made based upon a polyurethane dispersion with solid matter content between 30 and 40% limits included, and
   wherein the relief has a maximum relief depth which is larger than 200 microns.

* * * * *